United States Patent
Manuja et al.

(10) Patent No.: US 10,067,646 B2
(45) Date of Patent: Sep. 4, 2018

(54) COLOR SELECTOR FOR DESKTOP PUBLISHING

(71) Applicant: Adobe Systems Incorporated, San Jose, CA (US)

(72) Inventors: Sameer Manuja, Uttar Pradesh (IN); Ashish Duggal, Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/386,154

(22) Filed: Dec. 21, 2016

(65) Prior Publication Data

US 2017/0102843 A1  Apr. 13, 2017

Related U.S. Application Data

(63) Continuation of application No. 14/536,994, filed on Nov. 10, 2014, now Pat. No. 9,563,973.

(51) Int. Cl.
| | |
|---|---|
| *G06T 11/60* | (2006.01) |
| *G06F 3/0482* | (2013.01) |
| *G06T 11/00* | (2006.01) |
| *G06F 3/0484* | (2013.01) |

(52) U.S. Cl.
CPC ........ *G06F 3/0482* (2013.01); *G06F 3/04847* (2013.01); *G06T 11/001* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 9,563,973 B2 * | 2/2017 | Manuja | G06T 11/001 |
| 2007/0257933 A1 * | 11/2007 | Klassen | G06T 11/001 |
| | | | 345/593 |
| 2009/0157609 A1 | 6/2009 | Phan et al. | |
| 2011/0029914 A1 | 2/2011 | Whitby et al. | |
| 2011/0234613 A1 | 9/2011 | Hanson et al. | |
| 2011/0234615 A1 * | 9/2011 | Hanson | G06F 9/4443 |
| | | | 345/589 |
| 2013/0057566 A1 * | 3/2013 | Kriese | G09G 5/02 |
| | | | 345/589 |
| 2016/0133030 A1 | 5/2016 | Manuja et al. | |

* cited by examiner

*Primary Examiner* — Ryan M Gray
(74) *Attorney, Agent, or Firm* — Finch & Maloney PLLC

(57) ABSTRACT

Techniques are disclosed for color selection in a desktop publishing application. A color selection technique includes receiving a selection of an image, automatically sampling a color from a pixel of the selected image, and adding the sampled color to a color swatch in a graphical user interface. The sampled color may be the predominant color in the image (e.g., the color that appears in the greatest number of pixels), or the sampled color may be the darkest or lightest color in the image. In another embodiment, several colors (e.g., two, three, four, five, six, seven, eight, nine or ten) are sampled from different pixels of the selected image, and some or all of the sampled colors are added to the color swatch. A designer can then select the sampled color(s) from the color swatch and apply the selected color(s) to one or more elements of a layout.

20 Claims, 8 Drawing Sheets
(4 of 8 Drawing Sheet(s) Filed in Color)

*Original Image -- Un Cropped*

*CROPPED IMAGE*

COLOR SELECTOR FOR DESKTOP PUBLISHING

CROSS REFERENCE TO RELATED APPLICATIONS

This patent application is a continuation of U.S. application Ser. No. 14/536,994, filed Nov. 10, 2014, and entitled "COLOR SELECTOR FOR DESKTOP PUBLISHING," which is incorporated herein by reference in its entirety.

FIELD OF THE DISCLOSURE

This disclosure relates to the field of data processing, and more particularly, to techniques for color selection in a desktop publishing application.

BACKGROUND

Desktop publishing software applications are used to create documents with graphical layouts and typographic quality text and images, such as books, magazines, newspapers, posters, flyers and brochures. Some desktop publishing applications provide tools that designers can use to select and apply colors to the documents. Such tools include eyedropper tools, color selection tools or color sampling tools that are generally implemented in a graphical user interface. Using one of these tools, a designer can move an input device, such as a mouse, over the pixels in the display that correspond to the color the designer wishes to sample. The sampled color may then be selected from a color picker or other user interface control and applied to the desired regions of the document. However, existing color selection tools have several limitations. One limitation is that such tools require the designer to manually select a pixel from which to sample a color of interest, which adds at least one step in the designer's workflow for each color sampled. Furthermore, in the case where an undesired color is sampled, the designer must either sample another pixel or adjust the values of the sampled color to achieve the desired color. Accordingly, there is a need for an improved color selection technique.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings are not intended to be drawn to scale. In the drawings, each identical or nearly identical component that is illustrated in various figures is represented by a like numeral.

DETAILED DESCRIPTION

Figure 1:
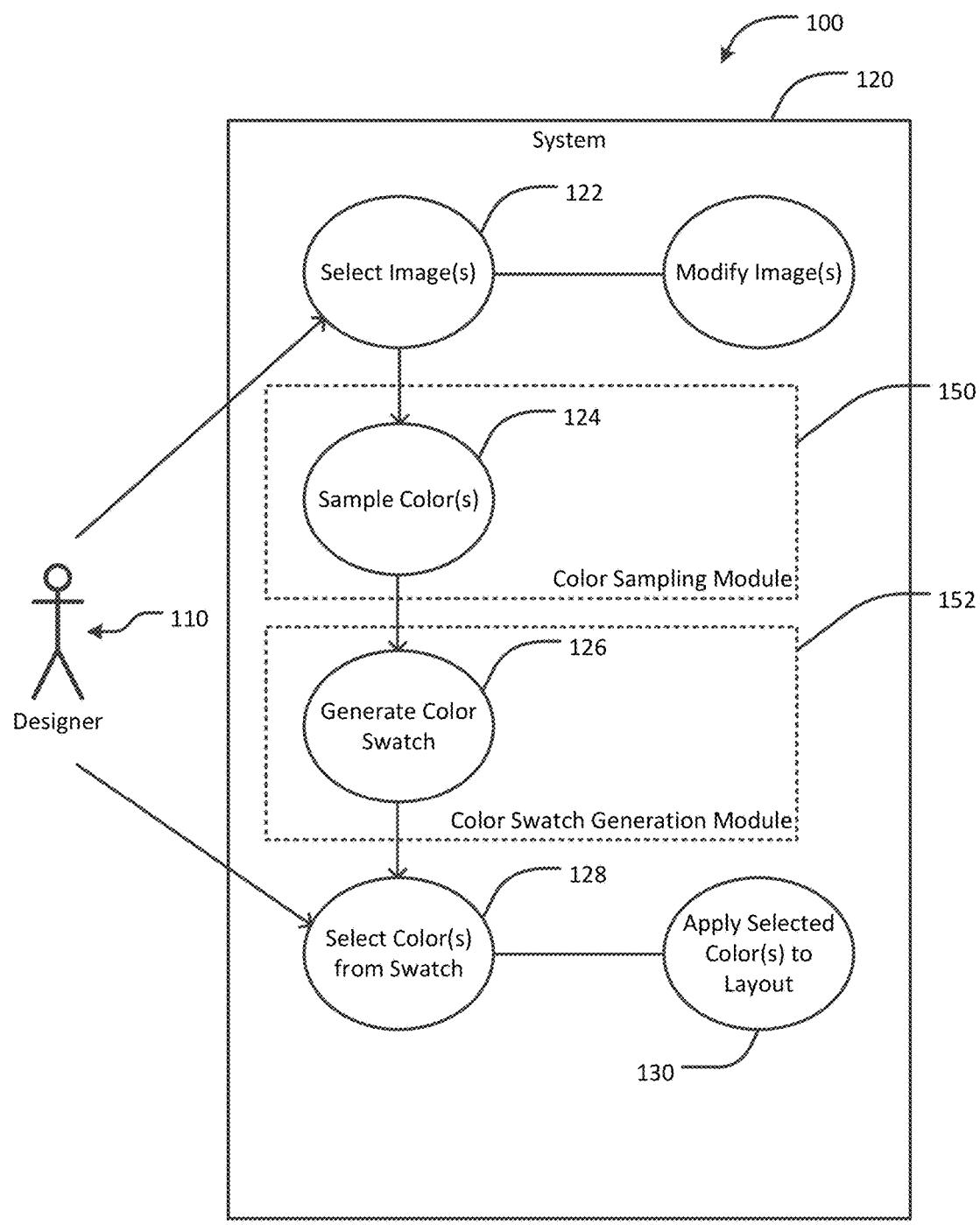
FIG. 1 shows an example workflow for color selection in a desktop publishing application, in accordance with an embodiment of the present invention.

Color sampling tools are among the most commonly used tools in desktop publishing applications. In particular, designers often derive color inspiration from images or artwork in the layout of the document. For example, a designer composing an advertisement may wish to apply one or more colors from the ad photograph to the text, such that the text has the same or a similar color as an object or background in the photo. Using an existing color sampling tool (e.g., an eyedropper) the designer can sample the color of one or more pixels in the photograph using an input device, such as a mouse, and then apply the sampled color to the accompanying text. This is, at minimum, a three-step process for each color the designer wishes to (i) sample from the image, (ii) select from a color picker, and (iii) apply to an element of the layout. Where the designer wishes to sample several colors, the number of steps increases accordingly, which can cause the design process to become tedious, repetitive and time consuming when working on large or complex layouts. Furthermore, in situations where the layout includes a slideshow of multiple images or a video, the designer may wish to have the color of certain elements of the layout change to maintain coherence with colors in the currently displayed image or video frame, a task which cannot easily be accomplished using existing color sampling tools.

To this end, and in accordance with an embodiment of the present invention, a technique is disclosed for color selection in a desktop publishing application. A color selection technique includes receiving a selection of a digital image, automatically sampling a color from at least one pixel of the selected image, and adding the sampled color to a color swatch in a graphical user interface. The sampled color may be the predominant color in the image (e.g., the color that appears in the greatest number of pixels), or the sampled color may be the darkest or lightest color in the image. In another embodiment, several colors (e.g., two, three, four, five, six, seven, eight, nine or ten) are sampled from different pixels of the selected image, and some or all of the sampled colors are added to the color swatch. These may be, for example, the most predominant colors, the brightest colors or the darkest colors in the image. A designer can then select the sampled color(s) from the color swatch and apply the selected color(s) to one or more elements of a layout. In this manner, the designer can use colors from the digital image without having to manually sample colors from the image, which makes the design process easier, faster and more efficient. Numerous configurations and variations will be apparent in light of this disclosure.

As used in this disclosure, the terms "layout" and "page layout" refer to an arrangement of graphic design elements on one or more pages of a digital document or publication. A layout may include, for example, an arrangement of text, images and other visual elements, such as commonly found in books, magazines, posters, advertisements, and other works of graphic art.

As used in this disclosure, the terms "swatch" and "color swatch" refer to a graphical user interface (GUI) for displaying one or more colors to a user. In some embodiments, the user can select one or more of the colors in the color swatch using an input device, such as a keyboard, mouse, touchscreen or light pen, and apply the selected color(s) to elements of the page layout.

Example Workflow and User Interface

FIG. 1 shows an example workflow 100 for color selection in a desktop publishing application, in accordance with an embodiment. A designer 110 interacts with a desktop publishing system 120 by initially selecting one or more images 122 the designer wishes to include in a layout. The images can be obtained from any source, such as an image database located on a personal computer or remotely on a cloud-based storage system. In some cases, the designer 110 need take no further action on the selected image, and may use the selected image as is (without any alteration or modification). In some other cases, the designer 110 can modify the selected image in any manner, such as by zooming in on a region of the image or cropping the image to remove undesired peripheral regions from view. In any case, a color sampling module 150 of the system 120 samples one or more colors 124 from the selected image in the unmodified or modified form, as the case may be. A color swatch generation module 152 of the system 120 generates 126 a color swatch with the sampled color(s). The designer 110 can select any color 128 on the color swatch and apply the selected color to the layout 130.

In an embodiment, the color or colors in the color swatch generated by the color swatch generation module 152 represent one or more predominant colors in the selected image (e.g., 1, 2, 3, 4, 5, 6, 7, 8, 9, 10 or any other number of colors). The number of colors in the color swatch can be fixed, user-selectable, or automatically selected to fit within the GUI (e.g., as the user resizes the GUI containing the color swatch, the number of colors in the swatch can increase or decrease as size permits). The most predominant color is the color that appears in the greatest number of pixels of the digital image. The next most predominant color is the color that appears in the second greatest number of pixels, and so forth. In another embodiment, the color or colors in the color swatch represent the darkest or lightest colors in the selected image, as measured by the amount of light in a given pixel of the image. For example, white may be the brightest color and black the darkest color, with the brightness of other colors ranging between white and black. Other color identification techniques (e.g., CMYK color model) can be used to determine which colors to sample, as will be apparent in view of this disclosure.

Figure 2:
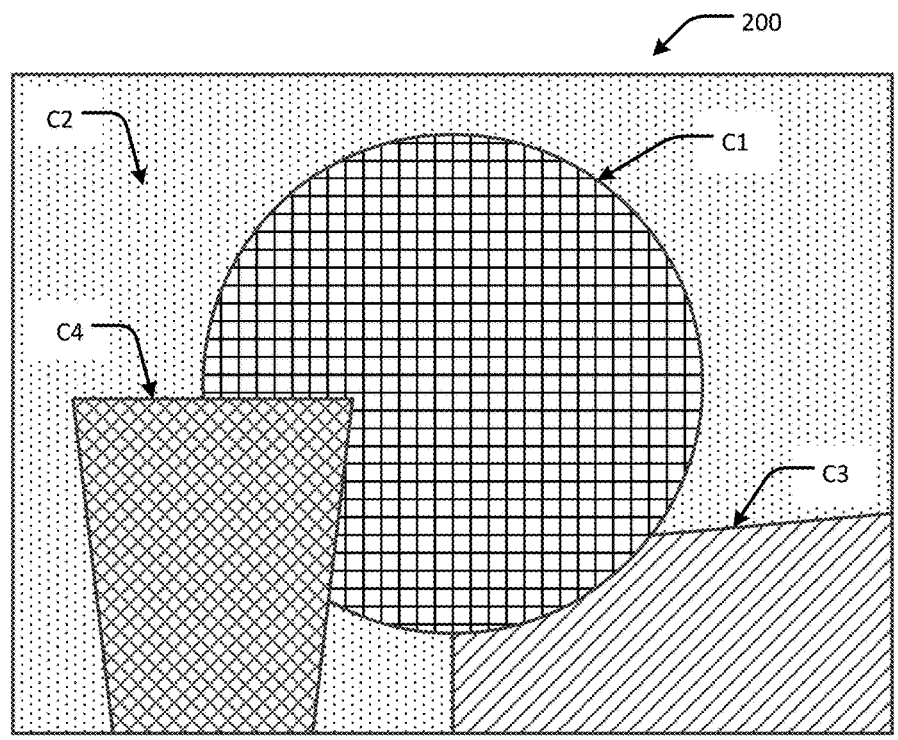
FIG. 2 is an example digital image.

FIG. 2 is an example digital image 200 containing four colors, generally referenced as C1, C2, C3 and C4. Roughly, the predominant colors are C1, C2, C3 and C4, in order from most predominant to least predominant. In some cases, the designer 110 will obtain inspiration from the colors C1, C2, C3 and C4 when creating a page layout. For example, if the image 200 includes a red foreground and a green background, the designer 110 may wish to use red in other design elements of the layout, such as text, because red matches the foreground color and contrasts with the background color.

Figure 3:
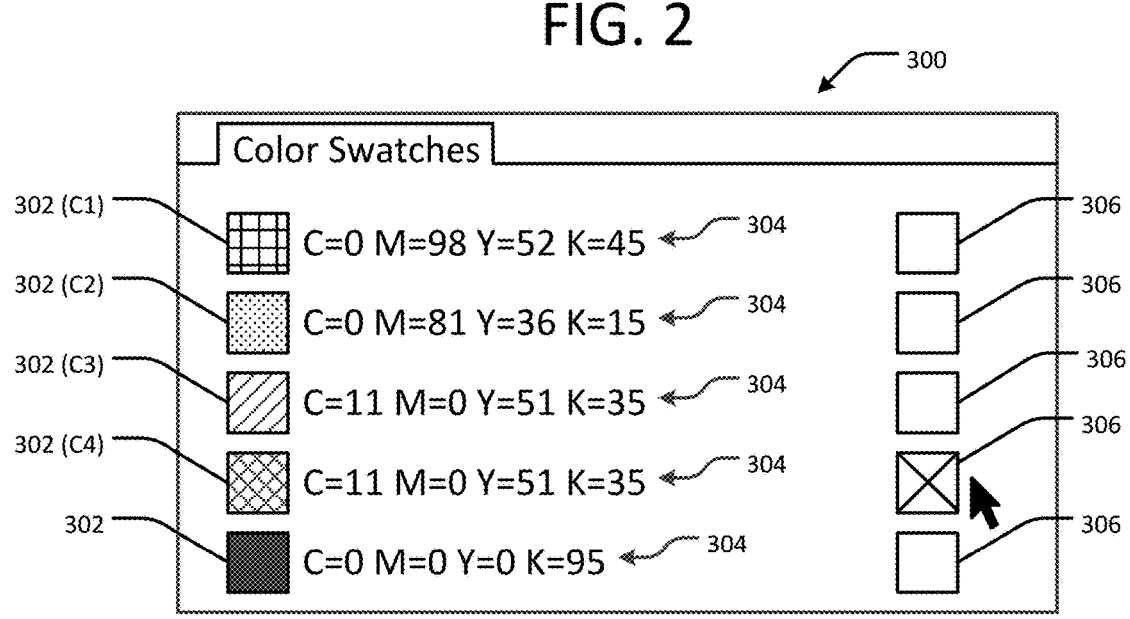
FIG. 3 shows a portion of an example graphical user interface for a desktop publishing application, in accordance with an embodiment of the present invention.

FIG. 3 shows a portion of an example graphical user interface 300, in accordance with an embodiment. The GUI 300 includes a color swatch generated from the example image 200 of FIG. 2. The GUI 300 may, for example, be implemented in, or in conjunction with, a desktop publishing application, such as Adobe InDesign®, Adobe Muse®, Adobe Dreamweaver® or Adobe Illustrator®. The example GUI 300 includes five icons 302 representing the four colors C1, C2, C3 and C4 of the example image 200 and a substantially black color. In this example, the fifth color (black) is automatically added to the GUI 300 as a convenience to the designer because black is a commonly used color, although any other color or colors that do not necessarily appear in the image, or are not predominant, can be used, such as a reference color or paper color (e.g., white). In one example, if the image includes twenty-two colors, the GUI 300 may include any or all of those twenty-two colors arranged from top to bottom in order of predominance, brightness or in some other order (e.g., numerically by color value or in random order). Adjacent to each color icon 302 is a color code or value 304 corresponding to color representation in the CMYK color model (cyan, magenta, yellow and key). For example, the color code 304 may represent the halftone screen angles of the CMYK color components, as are typically used in color printing applications and thus familiar to the designer 110. It will be understood that a color coding according to any color model can be used, such as CcMmYK process colors (CMYK plus light cyan (c) and light magenta (m)), or the RGB color model (red, green, blue), which is typically used in photography and digital display applications. Additionally or alternatively, a color name can be displayed in the GUI 300 (e.g., "green," "yellow," "red," etc.). Adjacent to the color code 304 or name is a selectable checkbox 306 that the designer 110 can use to select one or more of the colors in the swatch using an input device, such as a mouse.

After selecting a color in the GUI 300, the designer 110 can proceed to apply the selected color to the layout using the desktop publishing system 120. The designer 110 can return to the GUI 300 at any time to select a different color from the swatch. In this manner, the designer 110 can avoid using an eyedropper or other color selection tool to select one or more of the colors C1, C2, C3 and C4 and thus work more efficiently.

In another embodiment, more than one digital image may be selected, and the color swatch can include colors sampled from each image, which collectively represent a color theme associated with the page layout. Such images may, for example, form a slideshow or video that is embedded in the layout. As different images or scenes in a video are displayed in the layout, the color or colors of elements in the layout will automatically change to maintain coherency with the displayed image or video scene.

In some embodiments, an image can be selected from a slideshow of multiple images (e.g., select the first image in the slideshow). In such cases, colors extracted from the selected image will be included in the color swatch. The color swatch may, for example, include the most predominant color and the next most predominant color extracted from the selected image, or any other color in the selected image, such as the lightest color or the darkest color. The designer can apply the first color in the color swatch (e.g., the most predominant color extracted from the selected image) to a text element in the layout. The designer can apply the second color in the color swatch (e.g., the next most predominant color extracted from the selected image) to a page element in the layout. If the slideshow includes N images, the first and second colors (e.g., the most predominant and next most predominant colors) are automatically extracted from each image and a multi-state object (MSO) is created over the corresponding text and page elements. An MSO is an object in the page layout that has more than one version or state. Since the slideshow has N images, the MSO will have N states each corresponding to one image in the slideshow. For example, the $N^{th}$ state of the text element in the MSO has the first color of image N, and the $N^{th}$ state of the page element in the MSO has the second color of image N. Generally, one state of the MSO is visible on the page at a time. For example, a slideshow may let the user view each image in an exported SWF file. When $N^{th}$ image in the slideshow is displayed, the MSO is in the $N^{th}$ state. As such the color of the text and page elements will be in coherence with the displayed image. This MSO will be created automatically such that it displays the $m^{th}$ state color when $m^{th}$ image in the slideshow is displayed. This ensures coherence between elements in the page layout and image displayed in the slideshow (e.g., the MSO has the same predominant colors as the displayed image). A similar technique can be used for predominant frames of a video. For example, the designer may specify the time value of various scenes (e.g., scene at 1 minute, scene at 5 minutes, scene at 10 minutes, etc.) for which the text and page item colors to be in coherence with the scene. As such, it is only necessary to define one or more color mappings using one image or video frame for each element in the layout, and the remaining mappings can created automatically using MSOs. The techniques disclosed herein can be extended to multiple slideshows on a single page/layout, multiple images and multiple slideshows on a single page/layout, and multiple slideshows and videos on a single page/layout.

Figure 6A:
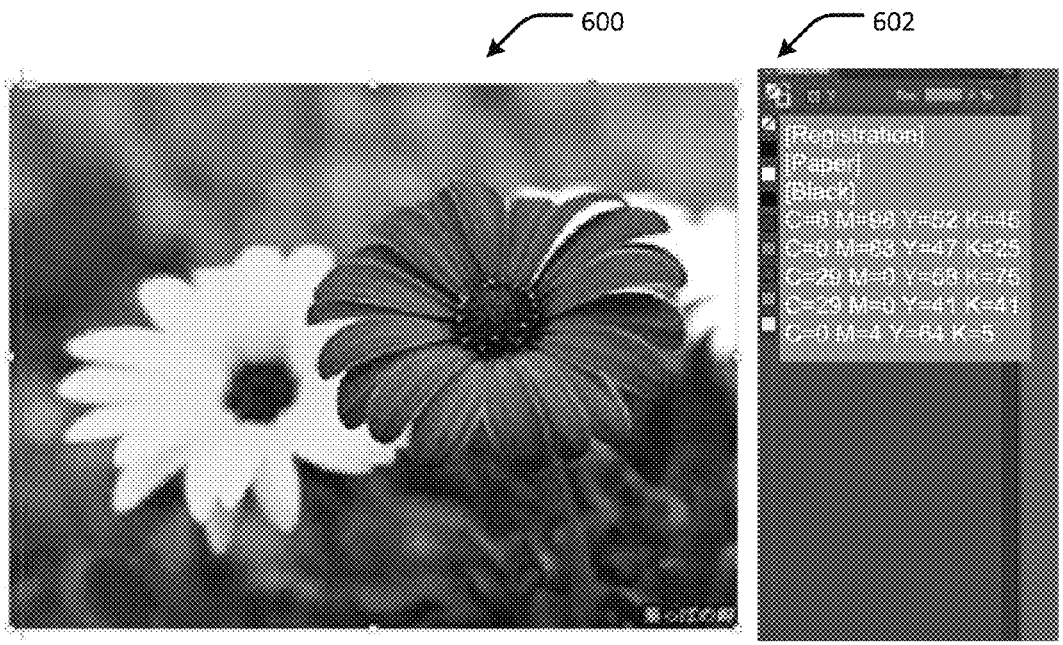
FIGS. 6A and 6B show two views of yet another example graphical user interface for a desktop publishing application, in accordance with an embodiment of the present invention.
Figure 6B:
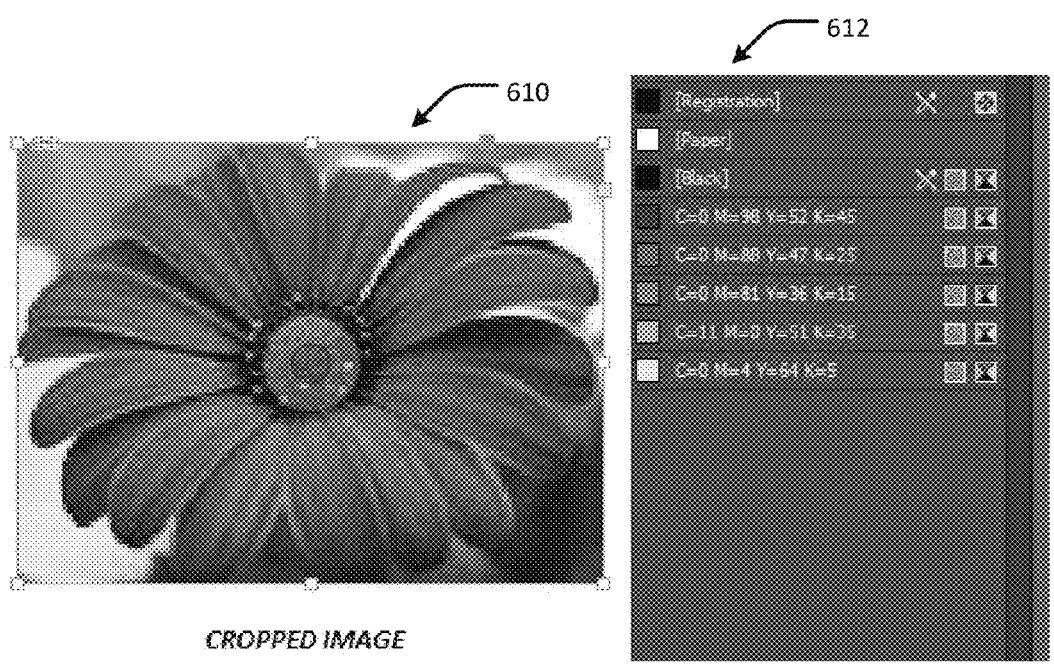

In yet another embodiment, the designer 110 can modify the visible portions of the selected image (e.g., zoom or crop), and the color swatch will automatically include only colors that are visible in the modified image, such as described with respect to FIGS. 6A and 6B.

Additional Examples

Figure 4:
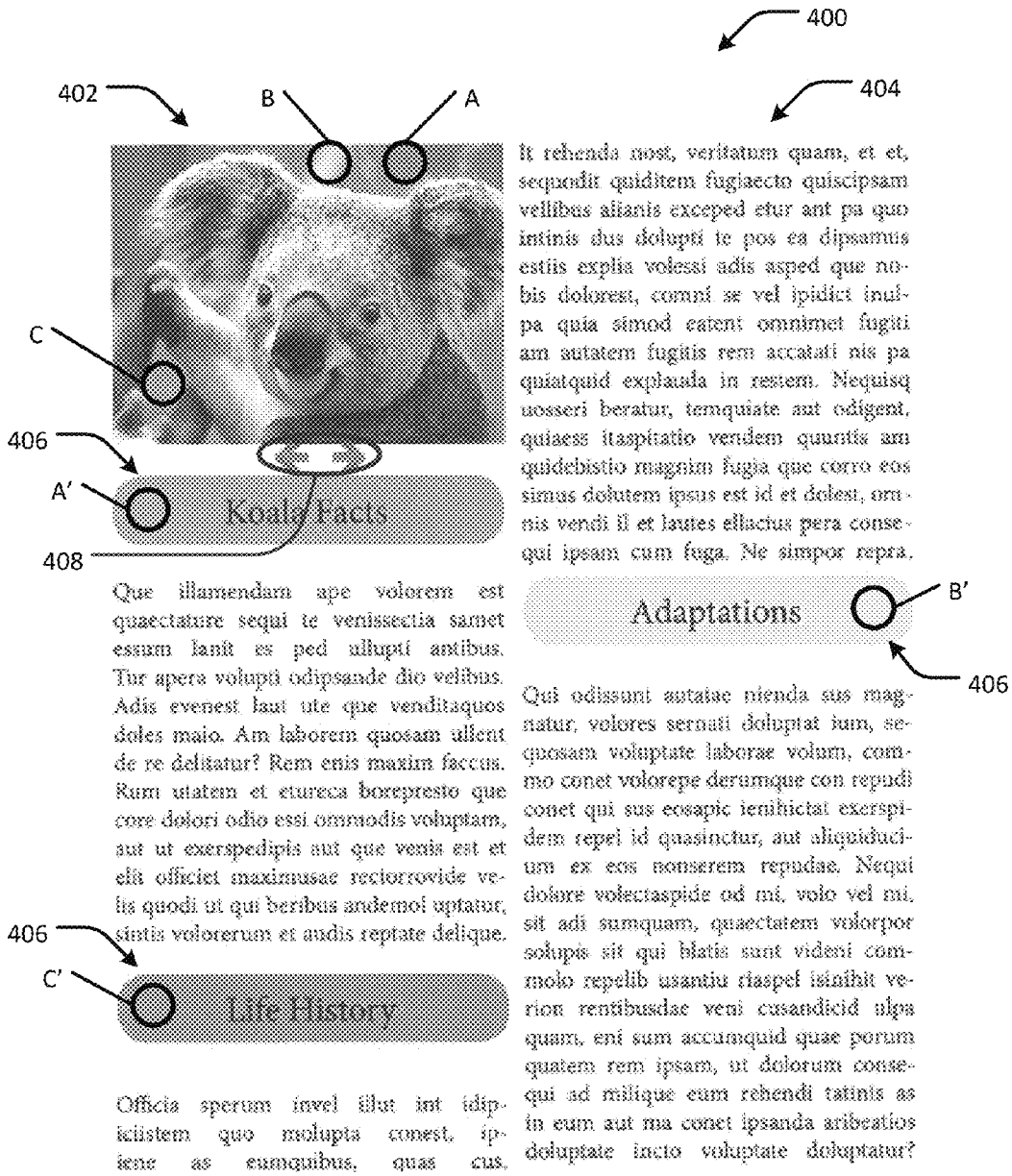
FIG. 4 is an example desktop publishing page layout, in accordance with an embodiment of the present invention.

FIG. 4 is an example desktop publishing page layout 400, in accordance with an embodiment. The layout 400 includes an image 402, text 404 and headings 406. The image 402 includes several colors generally referenced as A, B and C. As can be seen, each header 406 has a background color that matches one of the colors A, B and C, indicated at A', B' and C', respectively. An example workflow describing the creation of the layout 400 is described with respect to FIGS. 5A and 5B.

Figure 5A:
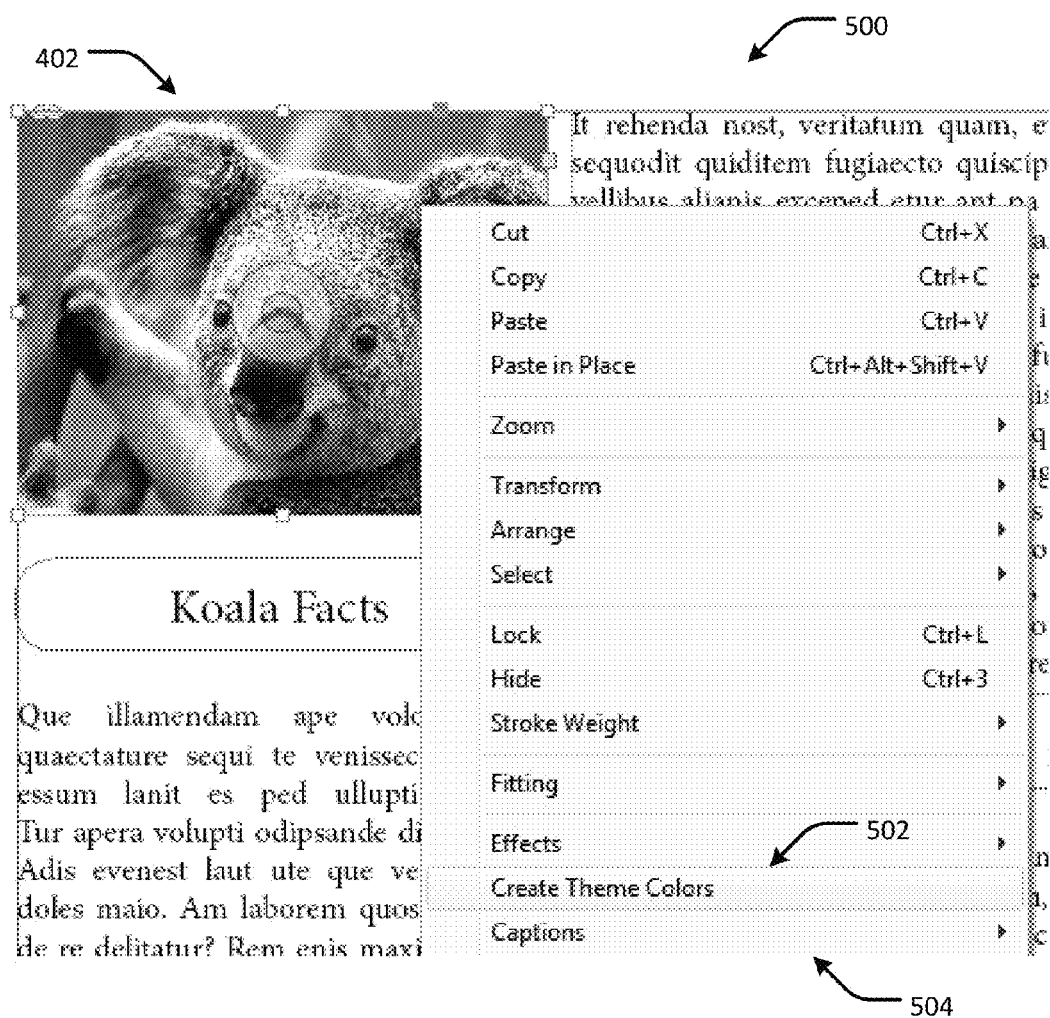
FIGS. 5A and 5B show another example user interface for a desktop publishing application, in accordance with an embodiment of the present invention.
Figure 5B:
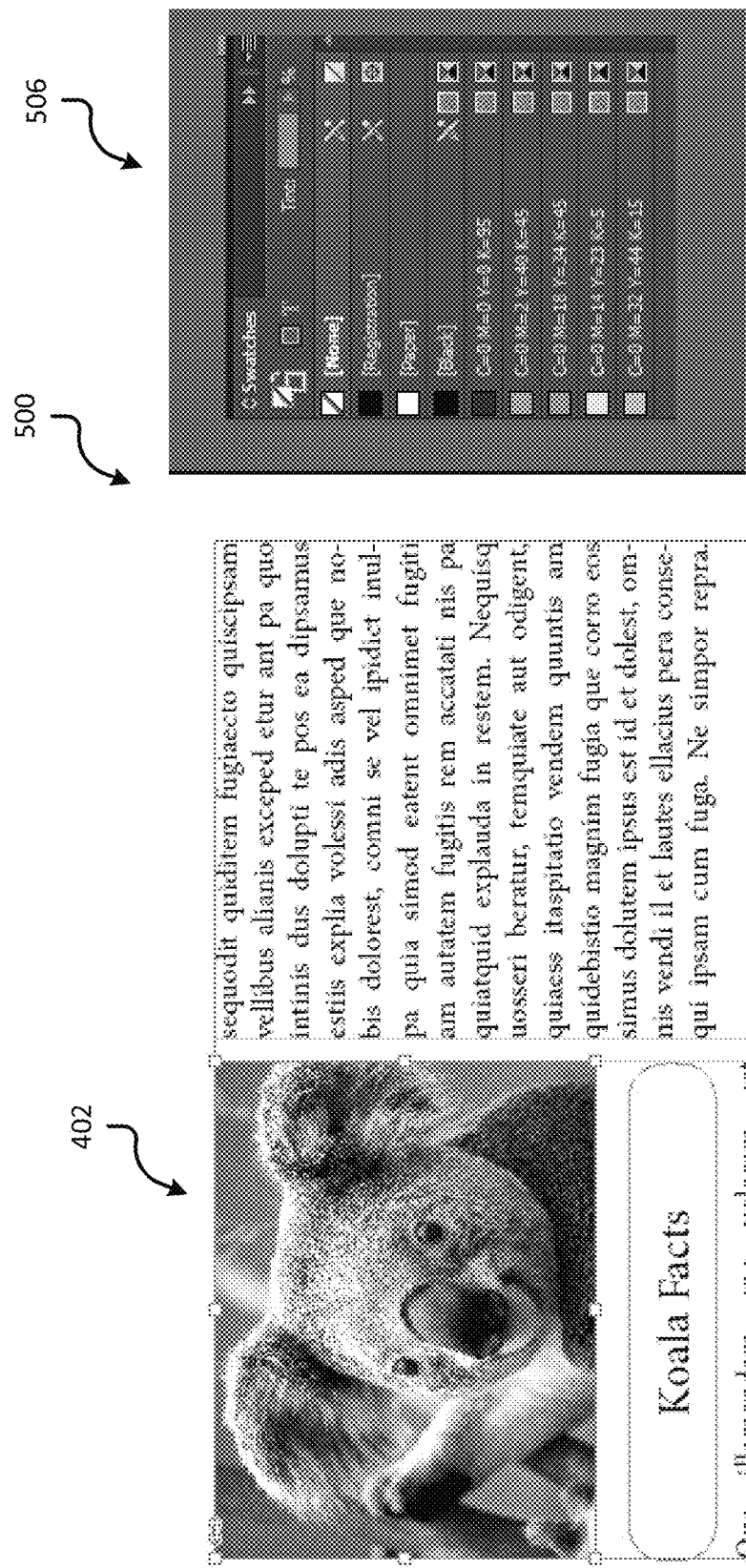

FIGS. 5A and 5B show an example user interface 500 of a desktop publishing application, in accordance with an embodiment. To create the example layout 400 of FIG. 4, a designer can select the image 402 in the user interface 500 (e.g., using a mouse right-click input) and select a command 502 from a drop-down menu 504 (e.g., "Create Theme Colors"), such as shown in FIG. 5A. In response to selecting the command 502, the desktop publishing application samples one or more colors from the image 402 and generates a GUI 506 having a color swatch representing the colors sampled from the image 402 (e.g., colors A, B and C), such as shown in FIG. 5B. From the GUI 506, the designer can select one or more of the colors on the swatch and apply them to the layout 400. For example, the designer may variously apply the colors A, B and C to the background of the headers 406 of FIG. 4 so that each header has the same color or different colors, as desired.

Referring again to FIG. 4, according to an embodiment, the page layout 400 can include an interactive control element 408 configured to enable a user to change the image 402 within the layout. For example, the interactive control element 408 may include left and right (next and previous) arrow buttons that allow the user to scroll between several images in a series, such as in a slideshow, or activate playback of a video or other multi-state graphical object in the layout 400. This is particularly useful for interactive electronic publications that are intended to be displayed on a computer screen or the like. For clarity, only one image 402 is shown in FIG. 4; however, it will be understood that different images, a slideshow or a video can be displayed in the layout 400. The designer can configure the layout 402 such that the background colors of the headings 406 change to correspond with colors associated with the currently displayed image 402 or video frame, while other elements of the layout (e.g., the text 404) do not necessarily change. The mapping between the state of the object (e.g., image or video frame) and the colors applied to the layout by the designer are remembered and stored along with the layout 400. Thus, as the user activates the left or right arrow buttons, the background colors of the headings 406 change as the different images 402, slides or video scenes are displayed. For example, if the background color of one heading is one color when the first image in the slideshow is displayed, the background color of the same heading is another color when the second image in the slideshow is displayed. In other words, the colors of the image and the page element (e.g., header background color) will remain in coherence as the image changes within the layout, as designated by the designer. If the user desires, the layout 400 as displayed can be printed with the currently displayed image and background heading colors. In the case of video, the designer can specify the time value of various scenes for which the designer wants the color of a particular element in the page layout to be in coherence with the video scene (e.g., scene at 1 minute, 5 minutes, 10 minutes, etc.). In some embodiments, a single page layout can include multiple images, multiple slideshows, multiple videos, or any combination of these.

FIGS. 6A and 6B show two views of an example user interface of a desktop publishing application, in accordance with an embodiment. FIG. 6A shows an image 600 and a GUI 602. The GUI 602 can be generated in accordance with an example process, such as the color sampling process described with respect to FIGS. 2 and 3. As can be seen, the colors in the image 600 are predominantly shades of purple, green and yellow, in decreasing degrees of predominance. The color swatch in the GUI 602 includes these predominant colors, listed in decreasing degrees of predominance. FIG. 6B shows a cropped version 610 of the image 600 of FIG. 6A. In the cropped version 610, the predominant colors include more shades of purple and fewer shades of green than in the uncropped image 600. As such, the GUI 612 can be automatically updated to include these different shades of color, again listed in decreasing degrees of predominance, in response to cropping the image 600.

Example Methodologies

Figure 7:
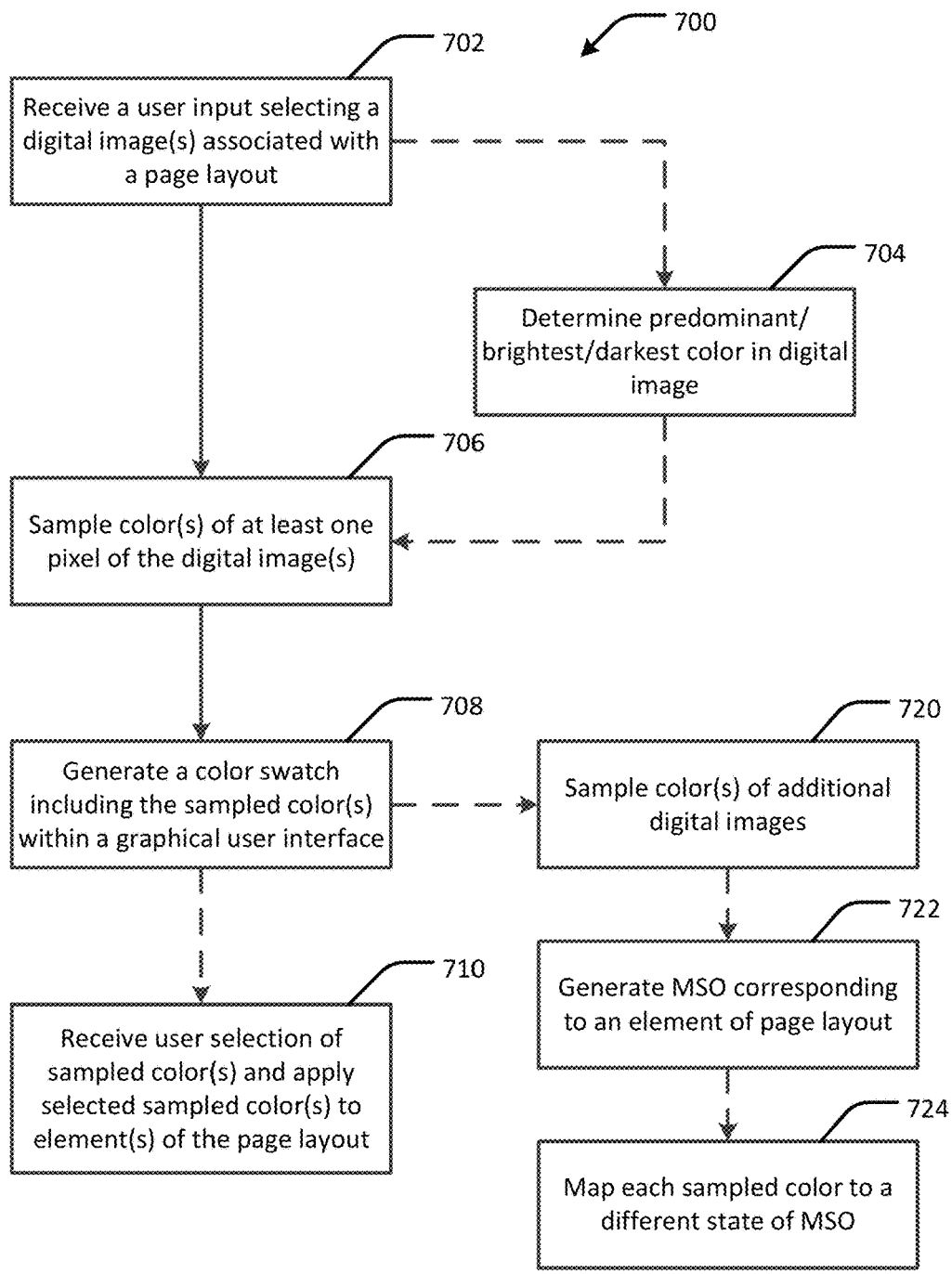
FIG. 7 is a flow diagram of an example methodology for color selection in a desktop publishing application, in accordance with an embodiment of the present invention.

FIG. 7 is a flow diagram of an example methodology 700 for color selection in a desktop publishing application, in accordance with an embodiment. The example methodology 700 or portions thereof may, for example, be implemented by the system 120 of FIG. 1, including the color sampling module 150 and color swatch generation module 152. The method 700 begins by receiving a user input selecting a digital image associated with a page layout. The digital image includes a plurality of pixels. In some embodiments, the method 700 continues by determining 704 the predominant color or colors in the digital image (e.g., the color that appears in the greatest number of pixels) or the brightest or darkest color or colors in the digital image. For example, the predominant color may be determined by sampling every pixel and incrementing a counter corresponding to each color. The counter with the highest value represents the most predominant color. Such a technique may be implemented, for example, in Java using the following pseudo-code:

```
Map<Color, Integer> color_counter;
    for (x : image_width) {
        for (y : image_height) {
            color = image.getPixel(x, y)
            occurrences = color_counter.get(color)
            color_counter.put(color, occurrences + 1)
        }
    }
```

In another example, the predominant color may be determined based on which reference color (e.g., red, green, yellow, orange, blue, magenta, cyan, white, grey, or black) is nearest to the color of each sampled pixel. The nearest color may be determined, for example, based on the distance between the sampled color and the reference color using the International Commission on Illumination (CIE) color distance metric $\Delta E^{*}_{ab}$ or another suitable color distance or difference metric. A similar technique can be used to determine the brightest or darkest colors based on the distance between the sampled color and a key color (e.g., black) or a paper color (e.g., white). In cases where similarly colored objects cover relatively large areas of the image, it is not necessary to sample every pixel. Instead, to improve performance, a subset of pixels (e.g., every $10^{th}$ pixel, every $100^{th}$ pixel, etc.) may be sampled to obtain an approximation of the predominant, brightest or darkest color(s) in the image. Other techniques for determining the predominant, brightest and darkest colors will be apparent.

The method 700 continues by sampling a color or multiple colors from at least one of the pixels of the digital image, and generating 708 a color swatch including the sampled color within a graphical user interface. In some cases, the color swatch is generated without use of a user-controlled color sampling tool, such as an eyedropper tool. The sampled color is user selectable from the color swatch via the graphical user interface using an input device, such as a mouse. Examples of such a color swatch and graphical user interface are shown and described with respect to FIGS. 2, 3, 5A, 5B, 6A and 6B. In some embodiments, the method 700 continues by receiving a user selection of the sampled color via the graphical user interface and applying the selected sampled color to one or more elements of the page layout. The element may, for example, be a text element, an image element or any other visual element of the page layout. In some cases, the element of the page layout is different than the digital image (e.g., text, a shape, a banner, or a background). In some embodiments, the methodology 700 can be extended to include a plurality of digital images, where the method includes sampling a plurality of colors, each sampled color being associated with at least one of the pixels of different digital images. In such cases, the color swatch includes each of the sampled colors (e.g., a color theme may be created for each of the images), and the method 700 includes applying different sampled colors to the same element of the page layout based on which of the digital images (e.g., multiple images, a slideshow or a video) is visible when the page layout is displayed on a display device, such as described above with respect to FIG. 4.

In some embodiments, the page layout includes a plurality of digital images, such as a series of images in a slideshow or a series of scenes in a video. Each digital image includes a plurality of pixels. In such cases, the method 700 includes sampling 720 different colors from each of the digital images (e.g., sampling one or more colors from each digital image in the slideshow or video scene). The method 700 further includes generating 722 a multi-state object (MSO) corresponding to an element of the page layout. The MSO has a plurality of states, each of which corresponds to one of the digital images such that the state of the MSO changes when different digital images are displayed in the page layout. The method 700 further includes mapping 724 each of the different sampled colors to different states of the MSO. In this manner, the color of the MSO element changes to be in coherence with the displayed image.

Example Computing Device

Figure 8:
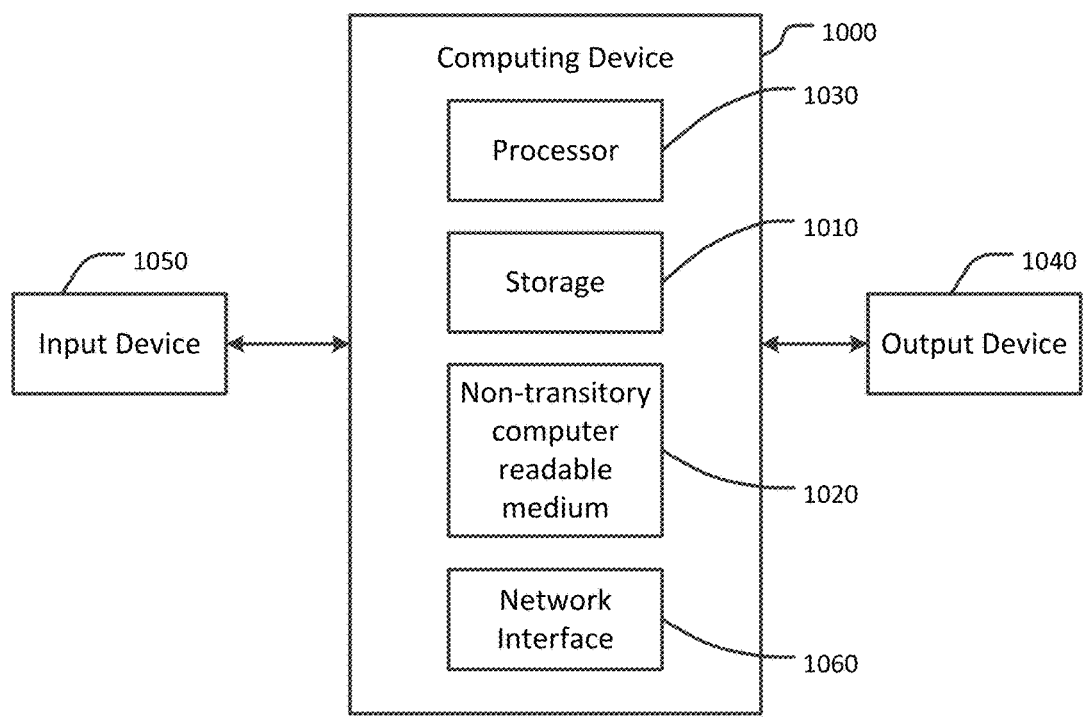
FIG. 8 is a block diagram representing an example computing device that may be used in accordance with an embodiment of the present invention.

FIG. 8 is a block diagram representing an example computing device 1000 that may be used to perform any of the techniques as variously described in this disclosure. For example, the system 120 may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals, such as a camera 1052. The computing device 1000 can include and/or be operatively coupled to various suitable devices for performing one or more of the functions as variously described in this disclosure.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system shown in FIG. 1, such as the color sampling module 150 and the color swatch generation module 152, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 1000, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described in this disclosure can be combined in any number of configurations. One example embodiment provides a system including a storage having at least one memory, and one or more processors each operatively coupled to the storage. The one or more processors are configured to carry out a process including receiving a user input selecting a digital image associated with a page layout, the digital image comprising a plurality of pixels; sampling, in response to the user input, a color from any one or more of the pixels of the digital image; and generating, within a graphical user interface, a color swatch including the color sampled from the one or more pixels, the sampled color being user selectable from the color swatch via the graphical user interface. In some cases, the process includes receiving a user selection of the sampled color via the graphical user interface and applying the selected sampled color to an element of the page layout. In some cases, the element of the page layout is different than the digital image. In some cases, the process includes determining a predominant color among all of the pixels, where the sampled color is the predominant color. In some cases, the process includes determining a brightest color among all of the pixels or a darkest color among all of the pixels, where the sampled color is the brightest color or the darkest color, respectively. In some cases, the color swatch is generated without use of a user-controlled color sampling tool (e.g., an eyedropper tool or other similar interactive color selection tool). In some cases, the page layout includes a plurality of digital images; and the process further comprises sampling different colors from each of the digital images; generating a multi-state object (MSO) corresponding to an element of the page layout, the MSO having a plurality of states; and mapping each of the different sampled colors to different states of the MSO. In some such cases, the color of the MSO is based on which of the digital images is visible when the page layout is displayed on a display device. Another embodiment provides a non-transient computer-readable medium or computer program product having instructions encoded thereon that when executed by one or more processors cause the processor to perform one or more of the functions defined in the present disclosure, such as the methodologies variously described in this paragraph. In some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented desktop publishing method comprising:
   receiving a plurality of digital images associated with a page layout, each of the digital images comprising a plurality of pixels;
   sampling different colors from at least one of the pixels;
   receiving a user selection of at least one of the sampled colors via a graphical user interface;
   generating a multi-state object (MSO) corresponding to an element of the page layout having at least one of the different colors selected by the user, the MSO having a plurality of states; and mapping each of the different sampled colors to different states of the MSO such that the MSO displays at least one of the sampled colors while the respective digital image is displayed in the page layout.

2. The method of claim 1, further comprising applying the at least one selected sampled color to an element of the page layout.

3. The method of claim 2, wherein the element of the page layout is different than the digital image.

4. The method of claim 1, further comprising determining a predominant color among all of the pixels, wherein at least one of the sampled colors is the predominant color.

5. The method of claim 1, further comprising determining one of a brightest color among all of the pixels and a darkest color among all of the pixels, wherein at least one of the sampled colors is one of the brightest color and the darkest color.

6. The method of claim 1, further comprising generating, within a graphical user interface, a color swatch including at least one of the sampled colors, the at least one sampled color being user selectable from the color swatch via the graphical user interface.

7. The method of claim 6, wherein the color swatch is generated without use of a user-controlled color sampling tool.

8. The method of claim 1, wherein the color of the MSO is based on which of the digital images is visible when the page layout is displayed on a display device.

9. A system comprising:
a storage; and
a processor operatively coupled to the storage, the processor configured to execute instructions stored in the storage that when executed cause the processor to carry out a process comprising:
receiving a plurality of digital images associated with a page layout, each of the digital images comprising a plurality of pixels;
sampling different colors from at least one of the pixels;
receiving a user selection of at least one of the sampled colors via a graphical user interface;
generating a multi-state object (MSO) corresponding to an element of the page layout having at least one of the different colors selected by the user, the MSO having a plurality of states; and
mapping each of the different sampled colors to different states of the MSO such that the MSO displays at least one of the sampled colors while the respective digital image is displayed in the page layout.

10. The system of claim 9, wherein the process includes applying the at least one selected sampled color to an element of the page layout.

11. The system of claim 10, wherein the element of the page layout is different than the digital image.

12. The system of claim 9, wherein the process includes determining a predominant color among all of the pixels, and wherein at least one of the sampled colors is the predominant color.

13. The system of claim 9, wherein the process includes determining one of a brightest color among all of the pixels and a darkest color among all of the pixels, and wherein at least one of the sampled colors is one of the brightest color and the darkest color.

14. The system of claim 9, wherein the process includes generating, within a graphical user interface, a color swatch including at least one of the sampled colors, the at least one sampled color being user selectable from the color swatch via the graphical user interface.

15. The system of claim 14, wherein the color swatch is generated without use of a user-controlled color sampling tool.

16. The system of claim 9, wherein the color of the MSO is based on which of the digital images is visible when the page layout is displayed on a display device.

17. A non-transitory computer program product having instructions encoded thereon that when executed by one or more processors cause a process to be carried out, the process comprising:
receiving a plurality of digital images associated with a page layout, each of the digital images comprising a plurality of pixels;
sampling different colors from at least one of the pixels;
receiving a user selection of at least one of the sampled colors via a graphical user interface;
generating a multi-state object (MSO) corresponding to an element of the page layout having at least one of the different colors selected by the user, the MSO having a plurality of states; and
mapping each of the different sampled colors to different states of the MSO such that the MSO displays at least one of the sampled colors while the respective digital image is displayed in the page layout.

18. The computer program product of claim 17, wherein the process includes applying the at least one selected sampled color to an element of the page layout.

19. The computer program product of claim 17, wherein the process includes determining a predominant color among all of the pixels, and wherein at least one of the sampled colors is the predominant color.

20. The computer program product of claim 17, wherein the process includes generating, within a graphical user interface, a color swatch including at least one of the sampled colors, the at least one sampled color being user selectable from the color swatch via the graphical user interface.

* * * * *